US012706406B2

(12) United States Patent
Lee et al.

(10) Patent No.: US 12,706,406 B2
(45) Date of Patent: Aug. 11, 2026

(54) CONNECTOR FOR TRANSMITTING RADIO FREQUENCY SIGNALS

(71) Applicant: LS MTRON LTD., Anyang-si (KR)

(72) Inventors: Su Chan Lee, Anyang-si (KR); Hyun Joo Hwang, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 425 days.

(21) Appl. No.: 18/277,034

(22) PCT Filed: Mar. 8, 2022

(86) PCT No.: PCT/KR2022/003264
§ 371 (c)(1),
(2) Date: Jan. 12, 2024

(87) PCT Pub. No.: WO2022/191578
PCT Pub. Date: Sep. 15, 2022

(65) Prior Publication Data

US 2024/0136745 A1 Apr. 25, 2024
US 2024/0235080 A9 Jul. 11, 2024

(30) Foreign Application Priority Data

Mar. 11, 2021 (KR) ........................ 10-2021-0032180
Sep. 7, 2021 (KR) ........................ 10-2021-0119148

(51) Int. Cl.
*H01R 12/75* (2011.01)
*H01R 24/40* (2011.01)

(52) U.S. Cl.
CPC ............. *H01R 12/75* (2013.01); *H01R 24/40* (2013.01)

(58) Field of Classification Search
CPC ...... H01R 12/75; H01R 24/40; H01R 9/0503; H01R 13/502; H01R 13/639; H01R 24/50; H01R 13/6581
USPC ................................. 439/694, 652, 581, 582
See application file for complete search history.

(56) References Cited

U.S. PATENT DOCUMENTS 7,878,850 B2 * 2/2011 Wu .................... H01R 13/6581 439/497
8,858,258 B2 * 10/2014 Stokowski ........... H01R 13/533 439/582

(Continued)

FOREIGN PATENT DOCUMENTS

JP 2008098034 A 4/2008
JP 2010061847 A 3/2010

(Continued)

OTHER PUBLICATIONS

International Search Report for related International Application No. PCT/KR2022/003264; action dated Sep. 15, 2022; (3 pages).

(Continued)

*Primary Examiner* — Hae Moon Hyeon
(74) *Attorney, Agent, or Firm* — K&L Gates LLP

(57) ABSTRACT

A connector for transmitting Radio Frequency (RF) signals is provided, which includes first and second RF contacts spaced apart from each other in a first axial direction; an insulation part coupling the first and second RF contacts a cover shell coupled to the insulation part; a first coaxial cable electrically connected to the first RF contact; a second coaxial cable spaced apart from the first coaxial cable in the first axial direction and electrically connected to the second RF contact; and a partition wall part coupled to the cover shell so that the first RF contact and the first coaxial cable are disposed on one side and the second RF contact and the second coaxial cable are disposed on the other side.

11 Claims, 12 Drawing Sheets

(56) References Cited

U.S. PATENT DOCUMENTS

| | | | | |
|---|---|---|---|---|
| 9,425,564 | B2 * | 8/2016 | Yamaguchi | H01R 24/40 |
| 11,251,556 | B2 * | 2/2022 | Niitsu | H01R 12/718 |
| 11,631,954 | B2 * | 4/2023 | Nakagawa | H01R 24/50 439/63 |
| 2014/0377990 | A1 * | 12/2014 | Saller | H01R 24/38 439/582 |
| 2015/0056869 | A1 * | 2/2015 | Yoshida | H01R 12/716 439/694 |
| 2015/0280372 | A1 | 10/2015 | Huang et al. | |
| 2021/0242631 | A1 * | 8/2021 | Nakagawa | H01R 9/05 |
| 2021/0265790 | A1 * | 8/2021 | Nakagawa | H01R 13/40 |

FOREIGN PATENT DOCUMENTS

| | | | |
|---|---|---|---|
| JP | 2019185858 | A | 10/2019 |
| JP | 2020068163 | A | 4/2020 |
| KR | 1020090021438 | A | 3/2009 |
| KR | 2020130003683 | U | 7/2013 |
| KR | 101407933 | B1 | 6/2014 |
| KR | 1020170072756 | A | 6/2017 |
| WO | 2021225122 | A1 | 11/2021 |

OTHER PUBLICATIONS

Written Opinion for related International Application No. PCT/KR2022/003264; action dated Sep. 15, 2022; (5 pages).

Notice of Allowance for related Japanese Application No. 2023-521183; action dated Jan. 24, 2025; (3 pages).

Office Action for related Japanese Patent Application No. 2023-521183; action dated Mar. 26, 2024; (4 pages).

Office Action for related Chinese Application No. 202280014391.5; action dated Jul. 1, 2026; (8 pages).

* cited by examiner

III-III

CONNECTOR FOR TRANSMITTING RADIO FREQUENCY SIGNALS

CROSS-REFERENCE TO RELATED APPLICATION

This application is a National Stage of International Application No. PCT/KR2022/003264 filed on Mar. 8, 2022, which claims priority to and the benefit of Korean Patent Application No. 10-2021-0032180, filed on Mar. 11, 2021, and Korean Patent Application No. 10-2021-0119148, filed on Sep. 7, 2021, the disclosures of which are incorporated herein by reference in their entirety.

FIELD

The present disclosure relates to a connector which is installed in an electronic device for electrical connection.

BACKGROUND

A connector is provided in various types of electronic devices for electrical connection. For example, the connector is installed in an electronic device such as a mobile phone, a computer, a tablet computer and the like such that various parts installed in the electronic device can be electrically connected to each other.

In general, among electronic devices, RF connectors that transmit radio frequency (RF) signals inside wireless communication devices such as smartphones and tablet PCs and the like, and board-to-board connectors (hereinafter, referred to as 'a board connector') that process digital signals such as cameras and the like are provided.

FIG. 1 is a conceptual perspective view showing a conventional electrical connection method using board connectors.

Referring to FIG. 1, when a first module 11 and a second module 12 are spaced apart from each other in an electronic device 10, conventionally, the first module 11 and the second module 12 are electrically connected by using a first board connector 14 and a second board connector 15 that are electrically connected to each other through a flexible printed circuit board (FPCB) 13.

The flexible circuit board 13 has flexibility, and it enables electrical connection by using board connectors 14, 15 for cases where the first module 11 and the second module 12 are spaced apart from each other, as well as for cases where the first module 11 and the second module 12 are arranged to face in different directions from each other.

However, since the flexible circuit board 13 has a higher unit price than a general printed circuit board (PCB), there is a problem in that the cost for electrically connecting the modules 11, 12 that are spaced apart from each other increases. In addition, this problem is further exacerbated as the distance in which the first module 11 and the second module 12 are spaced apart from each other increases.

SUMMARY

The present disclosure has been devised to solve the above-described problems, and an object of the present disclosure is to provide a connector which is capable of reducing the cost for electrically connecting modules that are spaced apart from each other.

In order to solve the above problems, the present disclosure may include the following configurations.

The connector according to the present disclosure may include a first radio frequency (RF) contact for RF signal transmission; a second RF contact which is spaced apart from the first RF contact in a first axial direction; an insulation part to which the first RF contact and the second RF contact are coupled; a cover shell to which the insulation part is coupled; a first coaxial cable which is electrically connected to the first RF contact; a second coaxial cable which is spaced apart from the first coaxial cable in the first axial direction and electrically connected to the second RF contact; and a partition wall part which is coupled to the cover shell such that, with respect to the first axial direction, the first RF contact and the first coaxial cable are disposed on one side and the second RF contact and the second coaxial cable are disposed on the other side.

According to the present disclosure, the following effects can be achieved.

The present disclosure is implemented so that the first module and the second module that are spaced apart from each other can be electrically connected by using a board connector and a cable having flexibility. Therefore, in the present disclosure, not only when the first module and the second module are spaced apart from each other, but also when the first module and the second module are arranged to face in different directions, electrical connection can be implemented through a board connector by using a coaxial cable that is relatively inexpensive compared to a flexible printed circuit board. Accordingly, according to the present disclosure, it is possible to reduce the cost for electrically connecting the first module and the second module that are disposed to be spaced apart from each other.

Since the present disclosure can transmit a plurality of RF signals by using a plurality of coaxial cables, it can be suitably utilized in electronic devices such as mobile devices or antenna transceivers that require multiple signals to be transmitted in a limited space.

The connector according to the present disclosure can implement a shielding function between coaxial cables by using a partition wall part. Therefore, the present disclosure can be implemented to transmit a plurality of RF signals by using a plurality of coaxial cables, while preventing the RF signals from interfering with each other. Accordingly, the present disclosure can contribute to improving the electromagnetic interference (EMI) shielding performance and electro-magnetic compatibility (EMC) performance between RF signals through coaxial cables by using a partition wall part.

DETAILED DESCRIPTION

Figure 1:
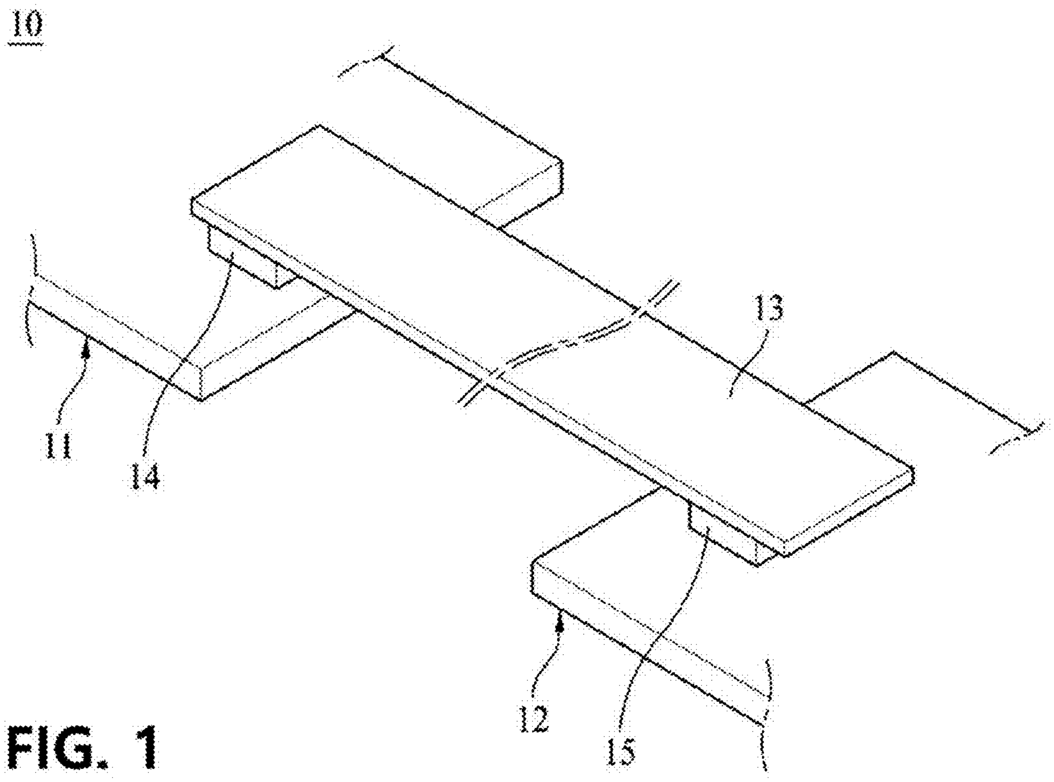
FIG. 1 PRIOR ART
FIG. 1 is a conceptual perspective view showing an electrical connection method using conventional board connectors.
Figure 2:
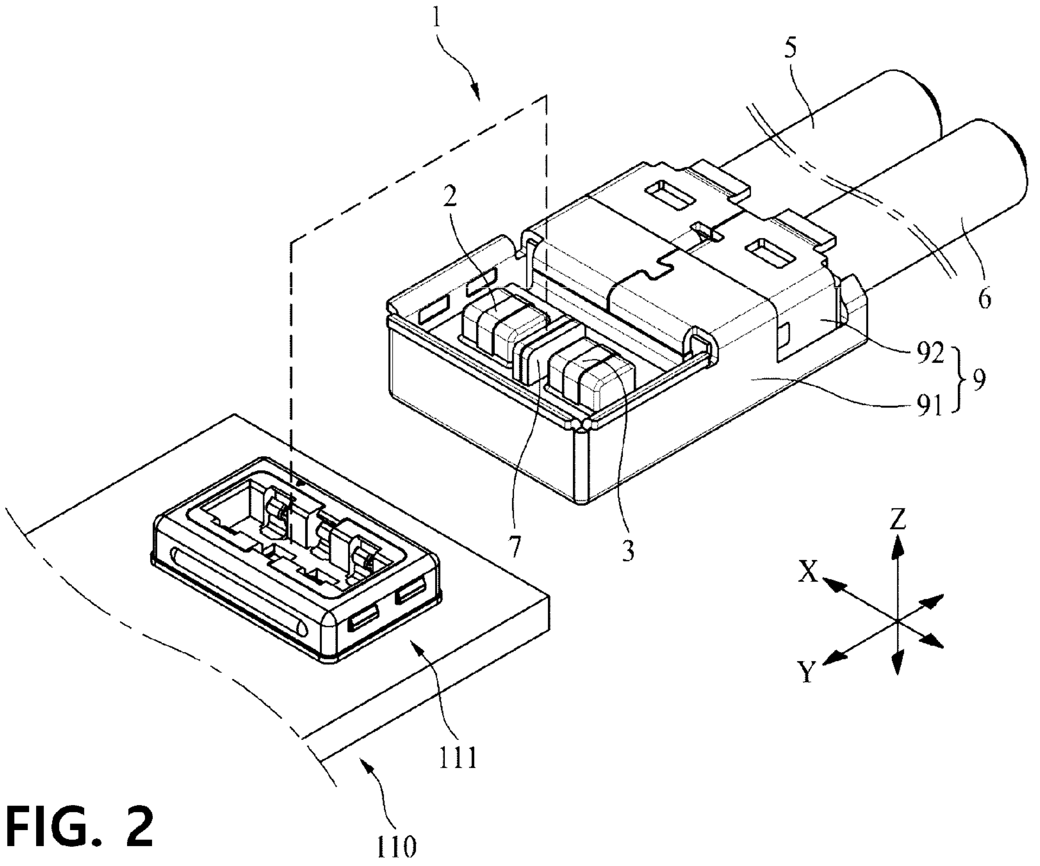
FIG. 2 is a schematic perspective view showing a state in which a connector according to the present disclosure is coupled to a counterpart connector.
Figure 3:
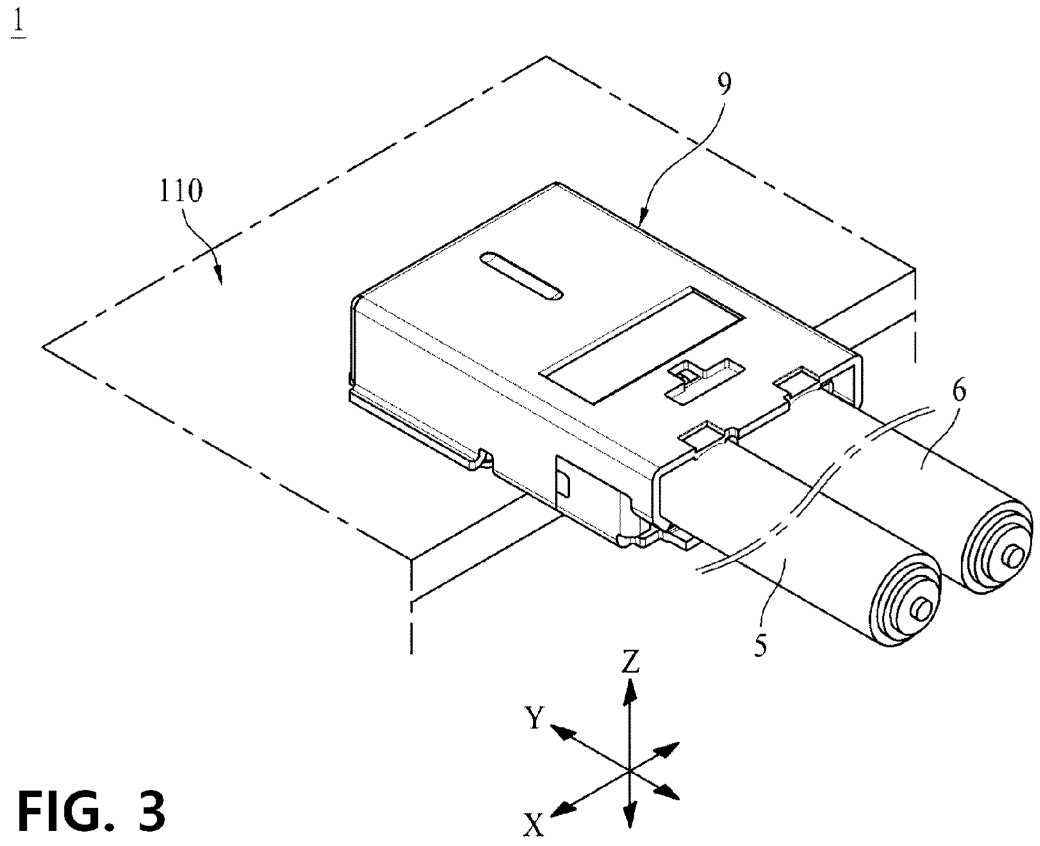
FIG. 3 is a schematic perspective view showing a state in which a connector according to the present disclosure is coupled to a counterpart connector.
Figure 4:
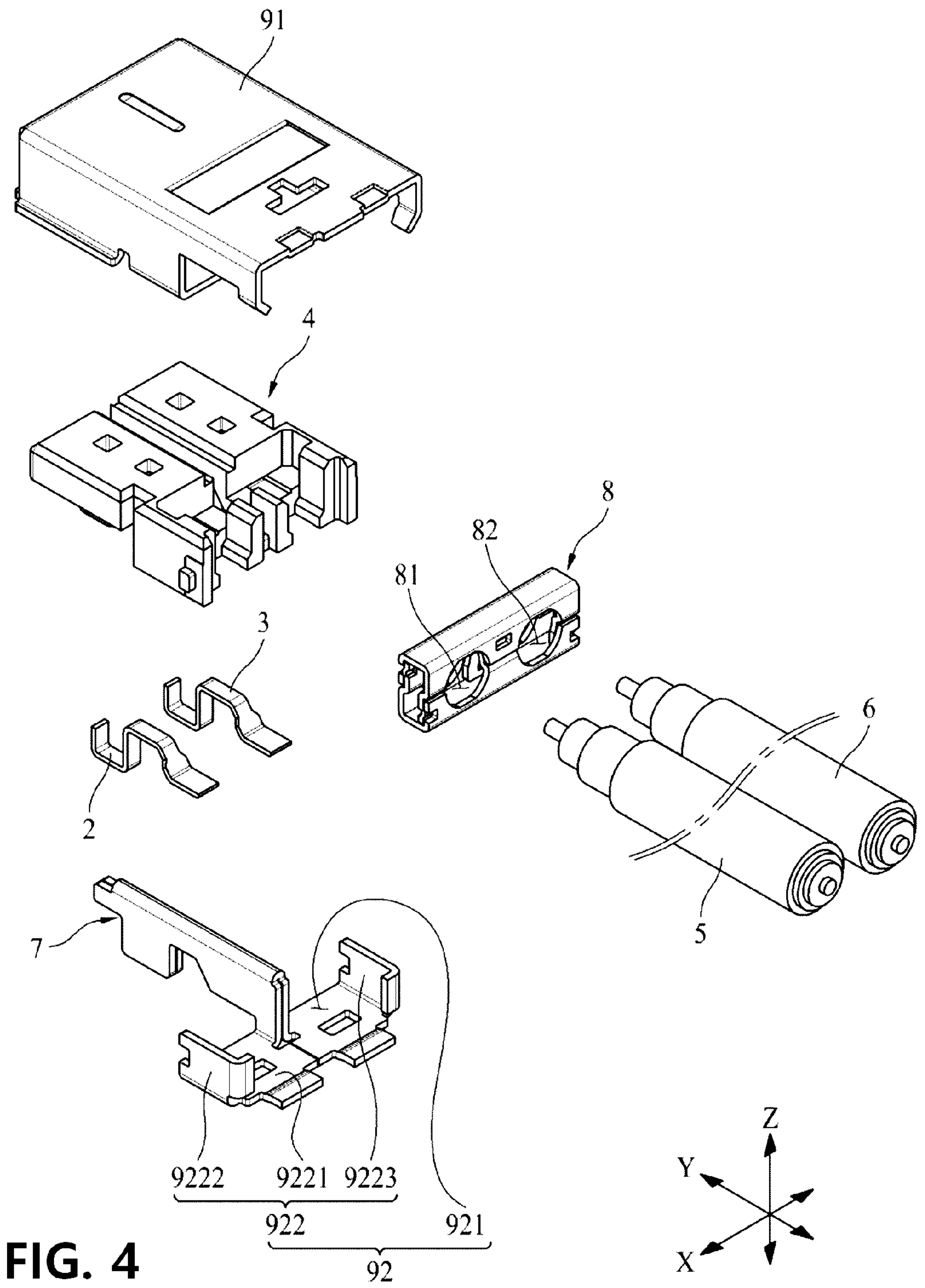
FIGS. 4 and 5 are schematic exploded perspective views of a connector according to the present disclosure.

Hereinafter, an exemplary embodiment of the connector according to the present disclosure will be described in detail with reference to the accompanying drawings.

Referring to FIGS. 2 to 5, the connector 1 according to the present disclosure may be installed in an electronic device (not illustrated) such as a mobile phone, a computer, a tablet computer and the like. The connector 1 according to the present disclosure may be used to electrically connect a plurality of modules (not illustrated) that are spaced apart from each other in an electronic device. The modules may be configurations that constitute components used for electronic device communication, such as an antenna, a main board and the like. For example, when a first module and a second module are electrically connected, the first module may be an antenna module, and the second module may be a driving module for driving the antenna module, a transmission/reception module for transmitting and receiving signals with the antenna module or the like.

Referring to FIGS. 2 to 5, the connector 1 according to the present disclosure may include a first RF contact 2, a second RF contact 3, an insulation part 4, a first coaxial cable 5, a second coaxial cable 6, a partition wall part 7 and a cover shell 9.

The first RF contact 2 and the second RF contact 3 are for transmitting radio frequency (RF) signals. The second RF contact 3 may be disposed to be spaced apart from the first RF contact 2 in a first axial direction (X-axis direction).

The insulation part 4 is coupled to the first RF contact 2 and the second RF contact 3. The insulation part 4 may be coupled to the cover shell 9. The first RF contact 2 and the second RF contact 3 may be connected to a first counterpart connector 111 of the first module 110 in a state of being supported by the insulation part 4.

Figure 6:
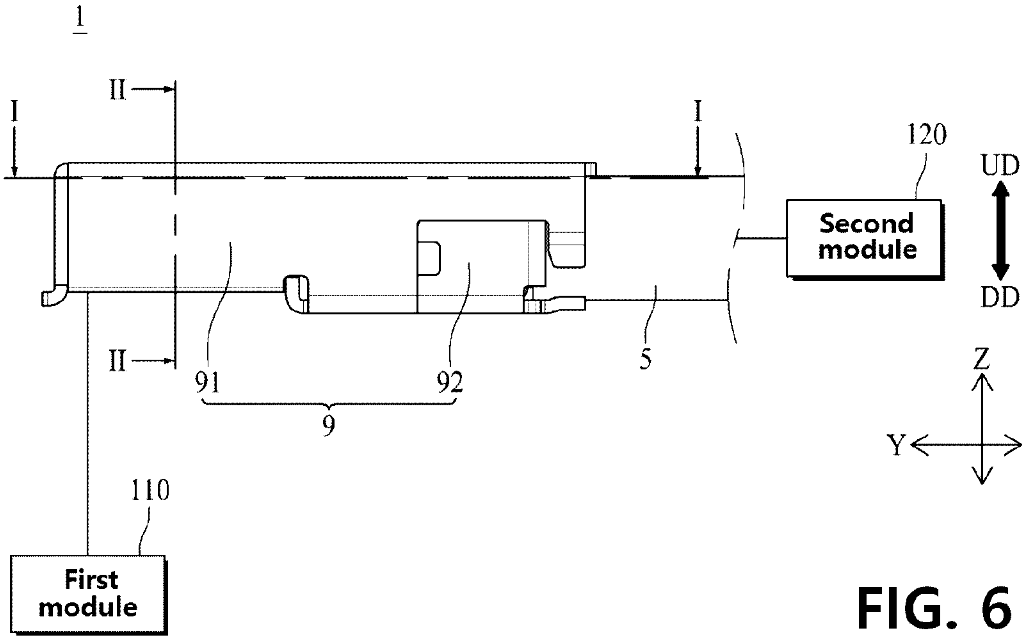
FIG. 6 is a schematic side view of the connector according to the present disclosure.
Figure 7:
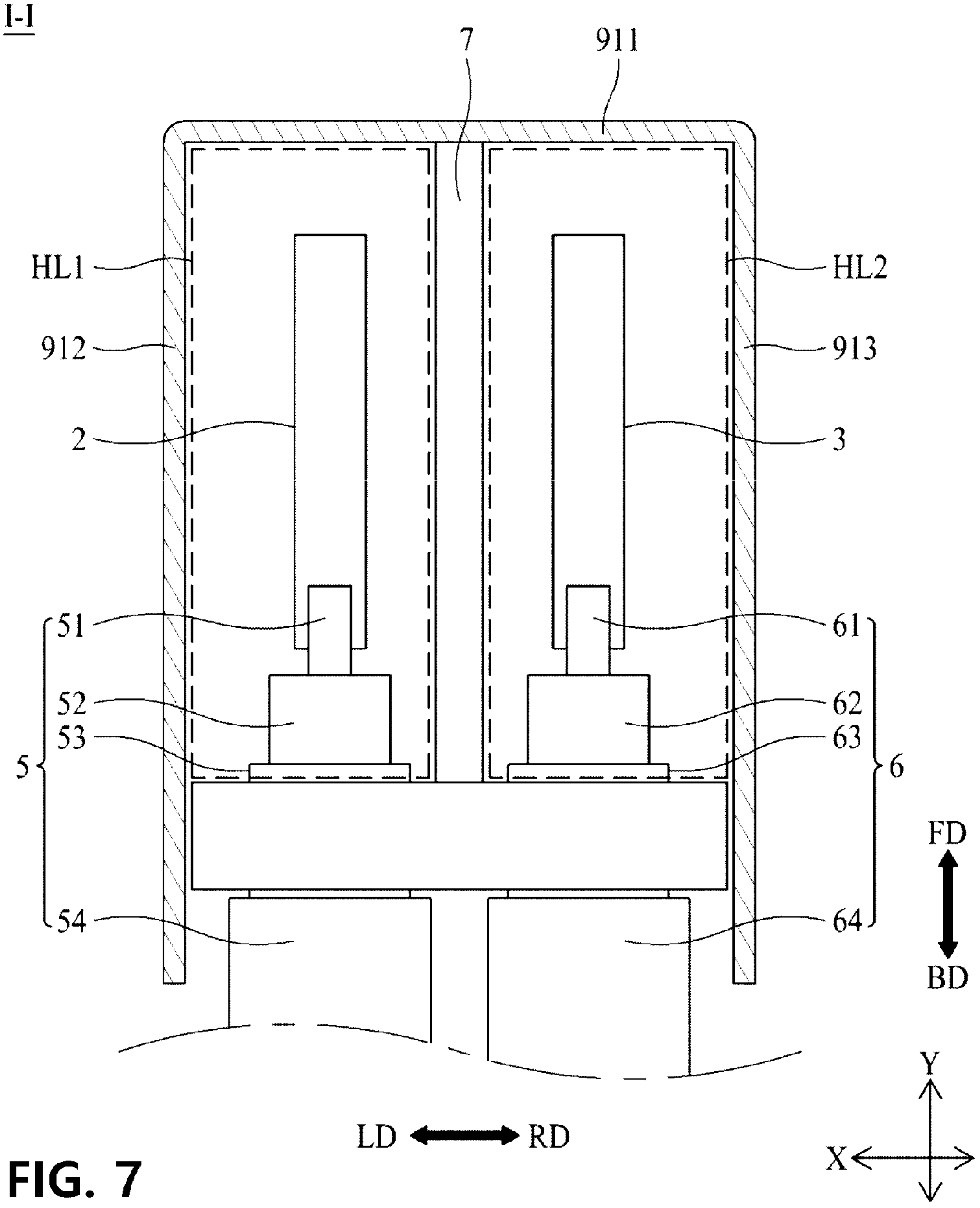
FIG. 7 is a schematic plan cross-sectional view taken along line I-I of FIG. 6.

The first coaxial cable 5 is electrically connected to the first RF contact 2. The first coaxial cable 5 may be connected to a first counterpart connector 111 of the first module 110 through the first RF contact 2. Accordingly, the first coaxial cable 5 may be electrically connected to the first module 110. Referring to FIG. 6, the first coaxial cable 5 may be electrically connected to the second module 120 which is disposed to be spaced apart from the first module 110 while being electrically connected to the first module 110 by using flexibility. For example, the first coaxial cable 5 may be directly electrically connected to the second module 120. For example, the first coaxial cable 5 may be electrically connected to the second module 120 by being connected to a second counterpart connector (not illustrated) of the second module 120. Accordingly, the connector 1 according to the present disclosure may electrically connect the first module 110 and the second module 120 that are disposed to be spaced apart from each other by using the first coaxial cable 5.

The second coaxial cable 6 is electrically connected to the second RF contact 3. The second coaxial cable 6 may be connected to a first counterpart connector 111 of the first module 110 through the second RF contact 3. Accordingly, the second coaxial cable 6 may be electrically connected to the first module 110. Referring to FIG. 6, the second coaxial cable 6 may be electrically connected to the second module 120 which is disposed to be spaced apart from the first module 110 while being electrically connected to the first module 110 by using flexibility. For example, the second coaxial cable 6 may be directly electrically connected to the second module 120. For example, the second coaxial cable 6 may be electrically connected to the second module 120 by being connected to a second counterpart connector (not illustrated) of the second module 120. Accordingly, the connector 1 according to the present disclosure may electrically connect the first module 11 and the second module 120 that are disposed to be spaced apart from each other by using the second coaxial cable 6.

Accordingly, the connector 1 according to the present disclosure can achieve the following effects.

First, the connector 1 according to the present disclosure is implemented such that the first module 110 and the second module 120 that are disposed to be spaced apart from each other may be electrically connected by using the first coaxial cable 5 and the second coaxial cable 6 having flexibility. Therefore, the connector 1 according to the present disclosure may implement electrical connection through the first board connector 34 by using the relatively inexpensive coaxial cables 5, 6 than a flexible printed circuit board 13 (illustrated in FIG. 1), not only for cases where the first module 110 and the second module 120 are spaced apart from each other, but also for cases where the first module 110 and the second module 120 are disposed to face in different directions. Accordingly, the connector 1 according to the present disclosure may reduce the cost of electrically connecting the first module 110 and the second module 120, compared to the comparative example using the flexible circuit board 13 (illustrated in FIG. 1).

Second, the connector 1 according to the present disclosure is implemented to transmit a plurality of RF signals by using the first coaxial cable 5 and the second coaxial cable 6. Accordingly, the connector 1 according to the present disclosure may be used more suitably for electronic devices such as mobile devices or antenna transceivers that require the transmission of multiple signals in a limited space, compared to the comparative example of transmitting a single RF signal by using one RF signal transmission cable.

Referring to FIGS. 2 to 8, the partition wall part 7 is coupled to the cover shell 9. With respect to the first axial direction (X-axis direction), the first RF contact 2 and the first coaxial cable 5 may be disposed on one side of the partition wall part 7, and the second RF contact 3 and the second coaxial cable 6 may be disposed on the other side of the partition wall part 7. That is, the partition wall part 7 may be disposed between the first RF contact 2 and the first coaxial cable 5, and the second RF contact 3 and the second coaxial cable 6. Accordingly, the connector 1 according to the present disclosure may implement a shielding function between the first coaxial cable 5 and the first RF contact 2, and the second coaxial cable 6 and the second RF contact 3 by using the partition wall part 7. Therefore, the connector 1 according to the present disclosure is implemented to transmit a plurality of RF signals by using a plurality of coaxial cables, as well as to prevent the RF signals from interfering with each other. For example, the connector 1 according to the present disclosure may shield a first signal line which is implemented as the first RF contact 2 and the first coaxial cable 5 are electrically connected and a second signal line which is implemented as the second RF contact 3 and the second coaxial cable 6 are electrically connected by using the partition wall part 7. Therefore, the connector 1 according to the present disclosure may contribute to improving the electro-magnetic interference (EMI) shielding performance and electro-magnetic compatibility (EMC) performance between RF signals through coaxial cables by using the partition wall part 7. The partition wall part 7 may be formed of a material having electrical conductivity. For example, the partition wall part 7 may be formed of metal. The partition wall part 7 may be grounded by being connected to a first counterpart ground contact (not illustrated) of a first counterpart connector 111 of the first module 110.

Hereinafter, the first RF contact 2, the second RF contact 3, the insulation part 4, the first coaxial cable 5, the second coaxial cable 6, the partition wall part 7 and the cover shell 9 will be described in detail with reference to the accompanying drawings.

Referring to FIGS. 2 to 8, the first RF contact 2 and the second RF contact 3 are for RF (Radio Frequency) signal transmission. The first RF contact 2 and the second RF contact 3 may transmit a very high frequency RF signal. The first RF contact 2 and the second RF contact 3 may be supported by the insulation part 4. The first RF contact 2 and the second RF contact 3 may be coupled to the insulation part 4 through an assembly process. The first RF contact 2 and the second RF contact 3 may be integrally molded with the insulation part 4 through injection molding.

The first RF contact 2 and the second RF contact 3 may be disposed to be spaced apart from each other with respect to the first axial direction (X-axis direction). The first RF contact 2 and the second RF contact 3 may be electrically connected to the first module 110 by being connected to the first counterpart connector 111. When the connector 1 according to the present disclosure is implemented as a plug connector, the first counterpart connector 111 may be implemented as a receptacle connector. When the connector 1 according to the present disclosure is implemented as a receptacle connector, the first counterpart connector 111 may be implemented as a plug connector.

Meanwhile, although FIGS. 2 to 12 illustrate that the connector 1 according to the present disclosure includes two RF contacts including only the first RF contact 2 and the second RF contact 3, the present disclosure is not limited thereto, and the connector 1 according to the present disclosure may include three or more RF contacts. In this case, the connector 1 according to the present disclosure may be provided with coaxial cables to correspond to the number of RF contacts. For example, when the connector 1 according to the present disclosure has three RF contacts, three coaxial cables may also be provided. In the present specification, the connector 1 according to the present disclosure will be described on the basis of including two RF contacts, that is, the first RF contact 2 and the second RF contact 3. From this, it will be apparent to those skilled in the art to derive an exemplary embodiment in which the connector 1 according to the present disclosure has three or more RF contacts and coaxial cables.

Figure 11:
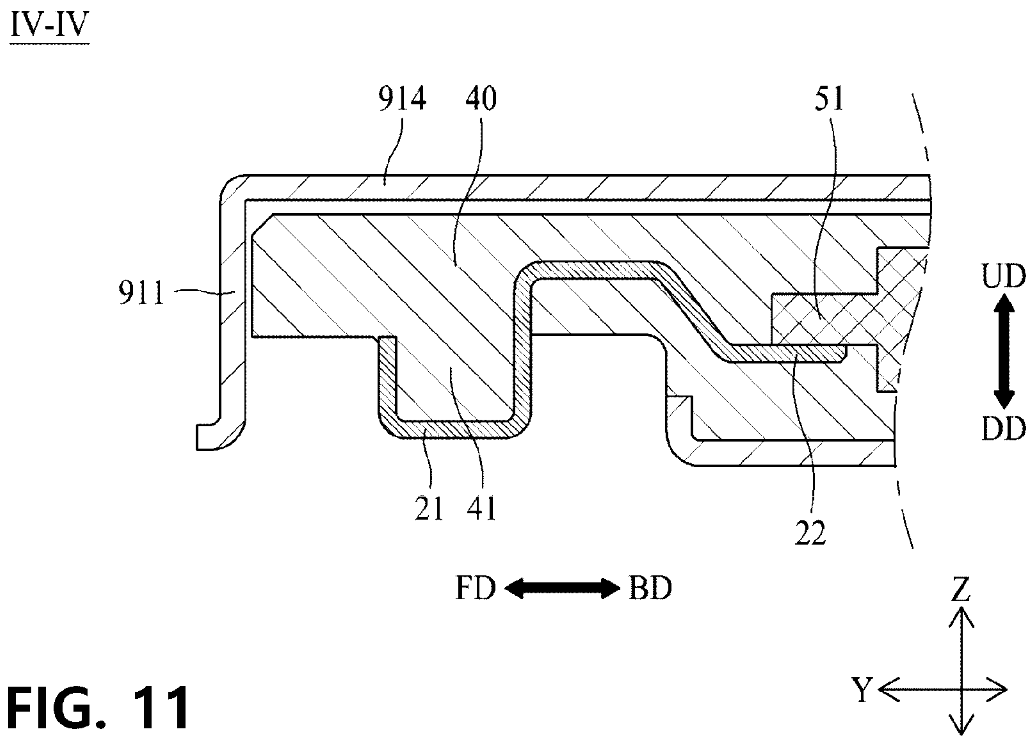
FIG. 11 is a schematic side cross-sectional view taken on line IV-IV of FIG. 9.

The first RF contact 2 may include a first RF connection member 22 (illustrated in FIG. 11) and the first RF contact member 21 (illustrated in FIG. 11).

The first RF connection member 22 is electrically connected to the first coaxial cable 5. The first coaxial cable 5 may be electrically connected to the first RF contact member 21 through the first RF connection member 22. Accordingly, the first coaxial cable 5 may be connected to the first counterpart connector 111 through the first RF contact member 21. The first RF connection member 22 may be disposed inside the insulation part 4. The first RF connection member 22 may be integrally molded with the insulation part 4 through injection molding.

The first RF contact member 21 is connected to the first counterpart connector 111. The first RF contact member 21 may be connected to an RF contact of the first counterpart connector 111. Accordingly, the first coaxial cable 5 may be connected to the first counterpart connector 111. The first RF contact member 21 may be coupled to the insulation part 4 so as to be exposed to the outside. The first RF contact member 21 may be connected to the first counterpart connector 111 through a connection hole (not illustrated) that is formed in the cover shell 9. The first RF contact member 21 may be located on a first RF protrusion 41 of the insulation part 4. To this end, the first RF contact member 21 may be bent in a downward direction (DD arrow direction) from the first RF connection member 22. The first RF protrusion 41 is formed to protrude downward (DD arrow direction) from the insulating body 40 of the insulation part 4 so as to be located in the connection hole. Accordingly, when the first RF protrusion 41 is inserted into an RF accommodating groove (not illustrated) of the first counterpart connector 111, the first RF contact member 21 may be electrically connected to an RF connection member of the first counterpart connector 111.

The first RF contact 2 may be formed of a material having electrical conductivity. For example, the first RF contact 2 may be formed of metal.

Figure 12:
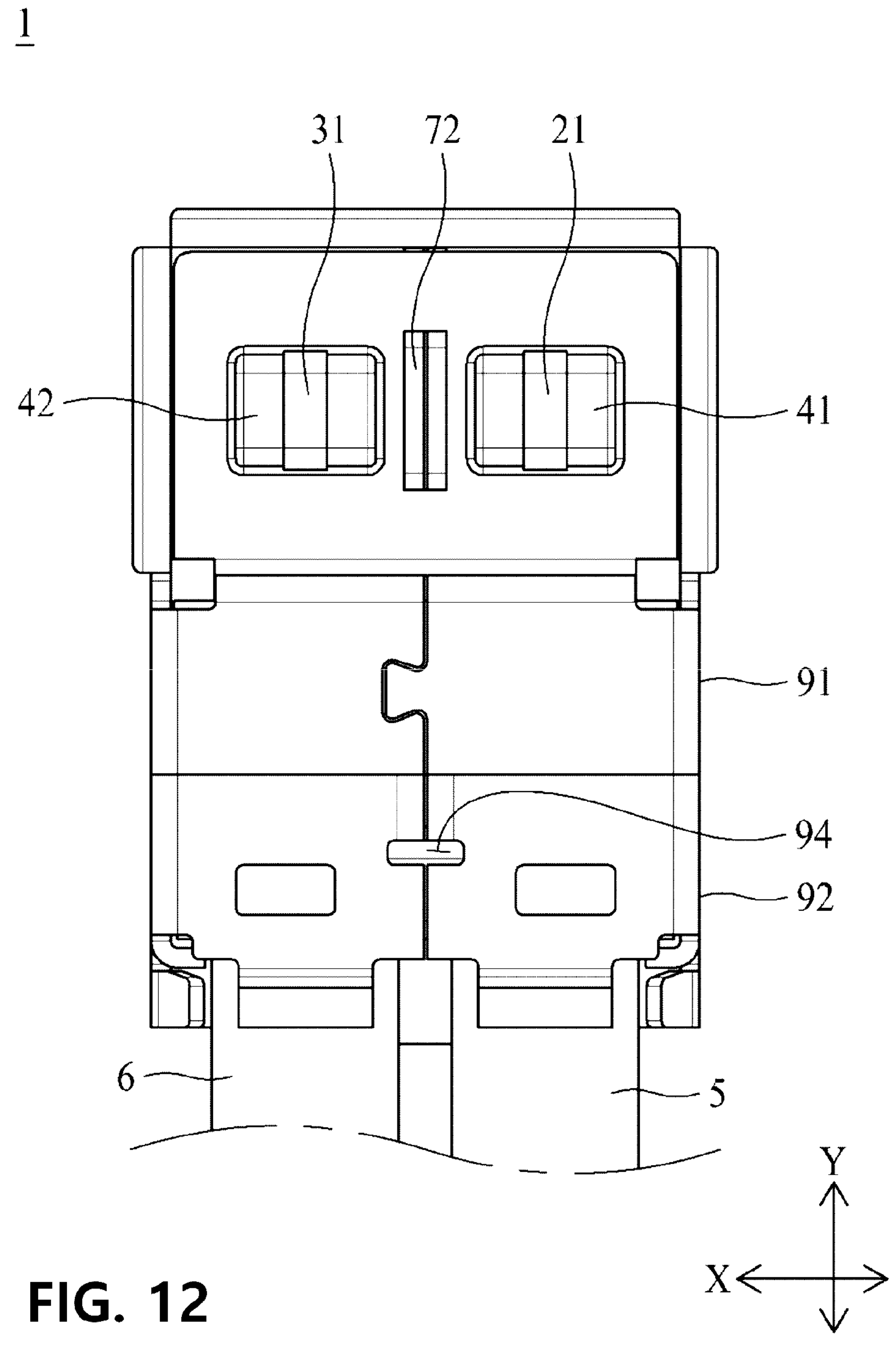
FIG. 12 is a schematic rear view of the connector according to the present disclosure.

The second RF contact 3 may include a second RF connection member (not illustrated) and a second RF contact member 31 (illustrated in FIG. 12). The second RF contact member 31 is electrically connected to the second coaxial cable 6. The second coaxial cable 6 may be electrically connected to the second RF contact member 31 through the second RF connection member. Accordingly, the second coaxial cable 6 may be connected to the first counterpart connector 111 through the second RF contact member 31. The second RF connection member 32 may be disposed inside the insulation part 4. The second RF connection member 32 may be integrally molded with the insulation part 4 through injection molding.

The second RF contact member 31 is connected to the first counterpart connector 111. The second RF contact member 31 may be positioned on the second RF protrusion 42 of the insulation part 4. The second RF protrusion 42 is positioned in the connection hole, and is disposed to be spaced apart from the first RF protrusion 41 in the first axial direction (X-axis direction). Since it approximately coincides with the first RF contact member 21 of the first RF contact 2, the detailed description thereof will be omitted.

The insulation part 4 supports the first RF contact 2, the second RF contact 3, the first coaxial cable 5 and the second coaxial cable 6. The first RF contact 2, the second RF contact 3, the first coaxial cable 5 and the second coaxial cable 6 may be coupled to the insulation part 4. The insulation part 4 may be formed of an insulating material.

Figure 5:
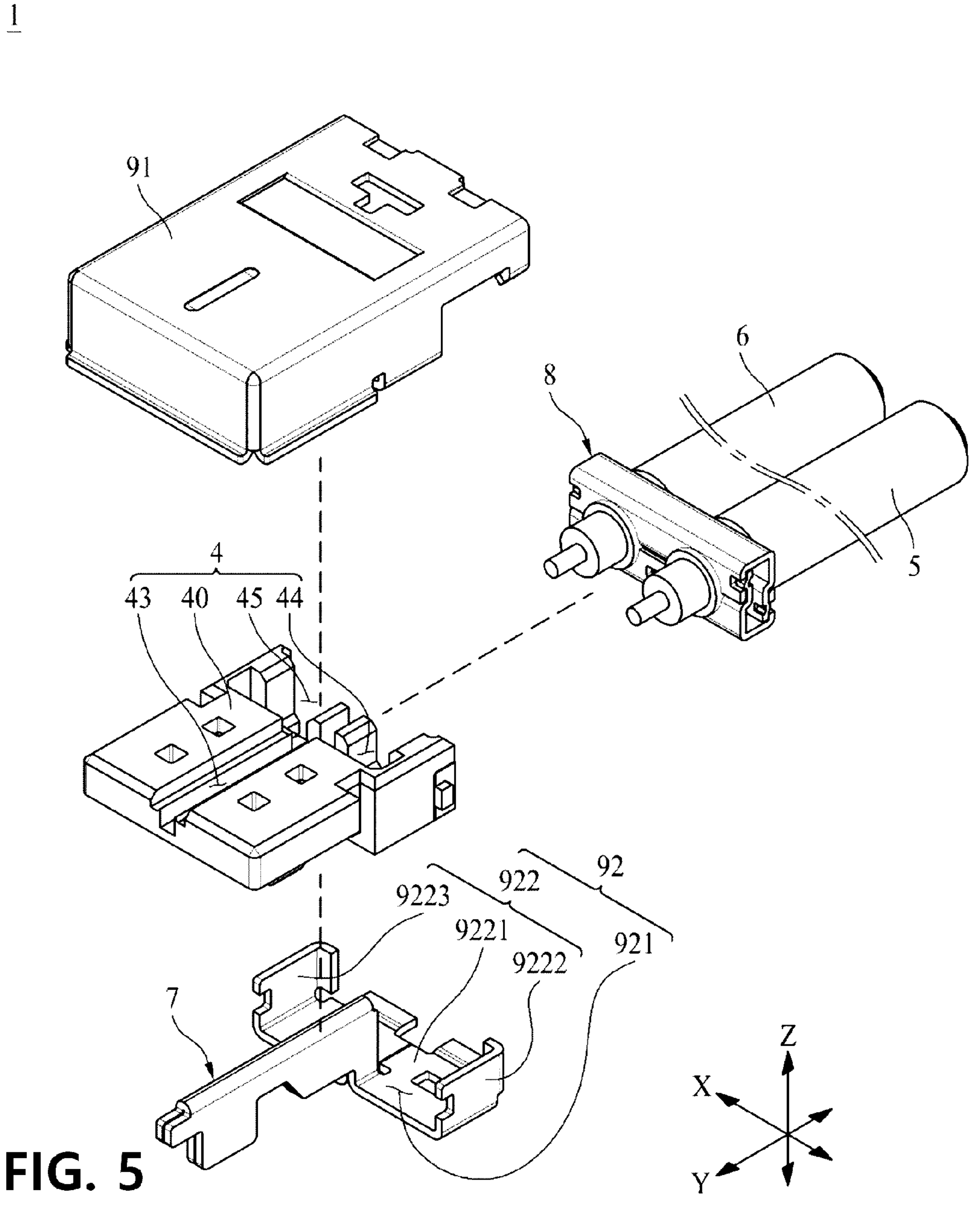

The insulation part 4 may include an insulating body 40 (illustrated in FIG. 5), a partition wall groove 43 (illustrated in FIG. 5), a first cable accommodating groove 44 (illustrated in FIG. 5) and a second cable accommodating groove 45 (illustrated in FIG. 5).

The insulating body 40 forms the overall outer shape of the insulation part 4. The insulating body 40 may be accommodated in the cover shell 9. The partition wall groove 43 is for accommodating the partition wall part 7. The partition wall groove 43 may be implemented by forming a groove by a predetermined depth from the upper surface of the insulating body 40. The partition part 7 may be inserted into the partition wall groove 43 to be coupled to the insulation part 4. The first cable accommodating groove 44 is for accommodating the first coaxial cable 5. The first cable accommodating groove 44 may be implemented by forming a groove by a predetermined depth from the upper surface of the insulating body 40. The first coaxial cable 5 may be inserted into the first cable accommodating groove 44 to be coupled to the insulation part 4. The first RF connection member 22 and the first coaxial cable 5 may be in contact through the first cable accommodating groove 44. The second cable accommodating groove 45 is for accommodating the second coaxial cable 6. The second cable accommodating groove 45 may be implemented by forming a groove by a predetermined depth from the upper surface of the insulating body 40. The second coaxial cable 6 may be inserted into the second cable accommodating groove 45 to be coupled to the insulation part 4. The second RF connection member and the second coaxial cable 6 may be in contact through the second cable accommodating groove 45.

The first coaxial cable 5 is for electrically connecting the first module 110 and the second module 120 that are disposed to be spaced apart from each other. One side of the first coaxial cable 5 may be electrically connected to the first module 110, and the other side may be electrically connected to the second module 120. In this case, the first coaxial cable 5 may be electrically connected to the first module 110 through the first RF contact 2. The first coaxial cable 5 may include a first connecting pin 51, a first internal insulating member 52, a first shielding member 53 and a first external insulating member 54. The first connecting pin 51 is electrically connected to the first RF contact member 21. The first connecting pin 51 may be in contact with the first RF contact member 21 through the first cable accommodating groove 44 to be electrically connected to the first RF contact member 21. The first internal insulating member 52 is coupled to the first connecting pin 51. The first internal insulating member 52 may be coupled to the first connecting pin 51 to surround the outside of the first connecting pin 51. The first connecting pin 51 may be coupled to the first internal insulating member 52 such that a portion thereof is exposed to the outside from the first internal insulating member 52. Accordingly, the first connecting pin 51 may be implemented such that the remaining portion except for the portion electrically connected to the first RF contact member 21 is insulated. The first internal insulating member 52 may be formed of an insulating material. The first shielding member 53 performs a shielding function for the first connecting pin 51. The first shielding member 53 may prevent electromagnetic waves and RF signals generated from the first connecting pin 51 from being radiated to the outside. The first shielding member 53 may be coupled to the first internal insulating member 52 so as to surround the outside of the first internal insulating member 52. The first shielding member 53 may be formed of a conductive material. For example, the first shielding member 53 may be formed of metal. The first external insulating member 54 is coupled to the first shielding member 53. The first external insulating member 54 may be coupled to the first shielding member 53 so as to surround the outside of the first shielding member 53. The first shielding member 53 may be coupled to the first external insulating member 54 such that a portion thereof is exposed to the outside from the first external insulating member 54. The first external insulating member 54 may be formed of an insulating material.

The second coaxial cable 6 is for electrically connecting the first module 110 and the second module 120 that are spaced apart from each other. One side of the first coaxial cable 5 may be electrically connected to the first module 110, and the other side may be electrically connected to the second module 120. In this case, the second coaxial cable 6 may be electrically connected to the first module 110 through the second RF contact 3. The second coaxial cable 6 may include a second connecting pin 61, a second internal insulating member 62, a second shielding member 63 and a second external insulating member 64. The second connecting pin 61 is electrically connected to the second RF contact member 31. The second connecting pin 61 may be in contact with the second RF contact member 31 through the second cable accommodating groove 45 to be electrically connected to the second RF contact member 31. The second internal insulating member 62 is coupled to the second connecting pin 61. The second internal insulating member 62 may be coupled to the second connecting pin 61 to surround the outside of the second connecting pin 61. The second connecting pin 61 may be coupled to the second internal insulating member 62 such that a portion thereof is exposed to the outside from the second internal insulating member 62. Accordingly, the second connecting pin 61 may be implemented such that the remaining portion except for the portion electrically connected to the second RF connection member is insulated from the outside. The second internal insulating member 62 may be formed of an insulating material. The second shielding member 63 performs a shielding function for the second connecting pin 61. The second shielding member 63 may prevent electromagnetic waves and RF signals generated from the second connecting pin 61 from being radiated to the outside. The second shielding member 63 may be coupled to the second internal insulating member 62 to surround the outside of the second internal insulating member 62. The second shielding member 63 may be formed of a conductive material. For example, the second shielding member 63 may be formed of metal. The second external insulating member 64 is coupled to the second shielding member 63. The second external insulating member 64 may be coupled to the second shielding member 63 so as to surround the outside of the second shielding member 63. The second shielding member 63 may be coupled to the second external insulating member 64 such that a portion thereof is exposed to the outside from the second external insulating member 64. The second external insulating member 64 may be formed of an insulating material.

Referring to FIGS. 2 to 12, the partition wall part 7 is coupled to the cover shell 9. The partition wall part 7 may be grounded to perform a shielding function. With respect to the first axial direction (X-axis direction), the first RF contact 2 and the first coaxial cable 5 may be disposed on one side of the partition wall part 7, and the second RF contact 3 and the second coaxial cable 6 may be disposed on the other side of the partition wall part 7. Accordingly, the partition wall part 7may prevent RF signals that are generated from the first RF contact 2 and the first coaxial cable 5 and RF signals that are generated from the second RF contact 3 and the second coaxial cable 6 from interfering with each other. In addition, since the connector 1 according to the present disclosure may increase a shielding between the first RF contact 2 and the second RF contact 3 without increasing the distance in which the first RF contact 2 and the second RF contact 3 are spaced apart through the partition wall part 7, it may contribute to the miniaturization of products.

The partition wall part 7 may be formed of a material having electrical conductivity. For example, the partition wall part 7 may be formed of metal. The partition wall part 7 may be formed of a thin metal plate. The partition wall part 7 may be implemented such that a plurality of plates overlap with respect to the first axial direction (X-axis direction). The partition wall part 7 may be grounded by being connected to a counterpart grounding contact of the first counterpart connector 111. The partition wall part 7 may be coupled to the insulation part 4 through an assembling process. The partition wall part 7 may be inserted into the partition wall groove 43 to be coupled to the insulation part 4.

Figure 10:
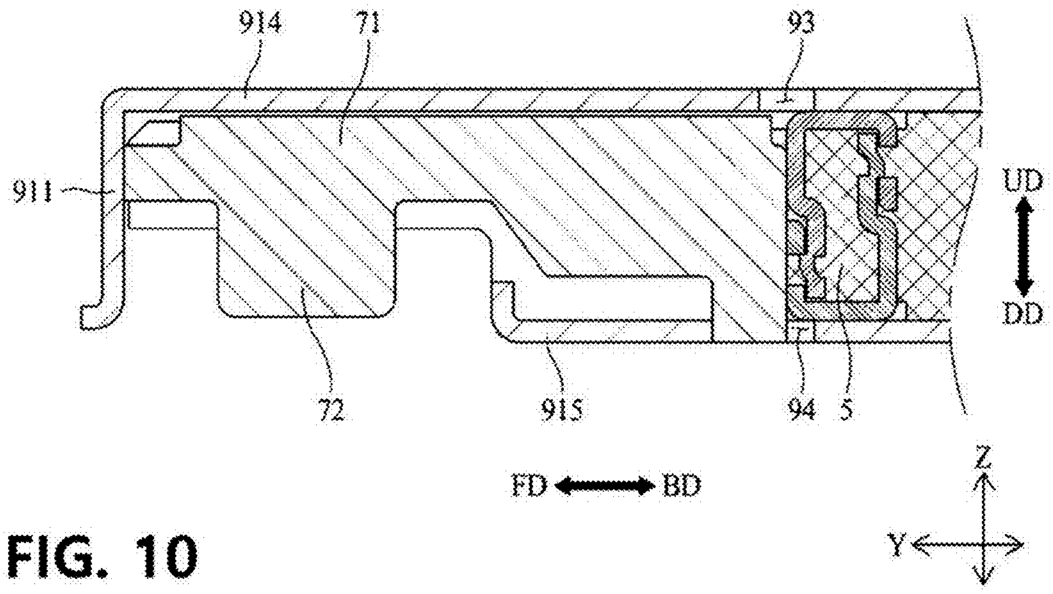
FIG. 10 is a schematic side cross-sectional view taken along line III-III of FIG. 9.

The partition wall part 7 may include a partition wall body 71 (illustrated in FIG. 10) and a grounding member 72 (illustrated in FIG. 10).

The partition wall body 71 is accommodated in the partition wall groove 43. The partition wall body 71 may be accommodated in the partition wall groove 43 to be disposed inside the insulating body 40. The partition wall body 71 may be coupled to the cover shell 9. The partition wall body 71 may be formed by bending with respect to a coupling line in which the cover shell 9 and the partition wall body 71 are coupled. The first RF contact 2 and the first coaxial cable 5 may be disposed on one side of the partition wall body 71, and the second RF contact 3 and the second coaxial cable 6 may be disposed on the other side of the partition wall body 71. Accordingly, the connector 1 according to the present disclosure may shield between the first RF contact 2 and the first coaxial cable 5, and the second RF contact 3 and the second coaxial cables 6 through the partition wall body 71. The partition wall body 71 may be formed of a thin plate made of a conductive material. For example, the partition wall body 71 may be formed of a thin metal plate. The partition wall body 71 may be formed of a plurality of plates.

The grounding member 72 is connected to a counterpart grounding contact of the first counterpart connector to be grounded. The grounding member 72 may be formed to protrude from the partition wall body 71. The grounding member 72 may be formed to protrude downward from the partition wall body 71 (DD arrow direction). The grounding member 72 may be formed to protrude from the insulating body 40 to the outside. The grounding member 72 may be located in a connection hole of the cover shell 9. The grounding member 72 may be positioned between the first RF protrusion 41 and the second RF protrusion 42 to shield between the first RF contact 2 and the second RF contact 3. Meanwhile, the grounding member 72 may be grounded through the cover shell 9. The grounding member 72 may extend in a second axial direction (Y-axis direction) which is perpendicular to the first axial direction (X-axis direction) to be connected to the cover shell 9 to be grounded.

Referring to FIGS. 3 to 12, the cover shell 9 is coupled to the insulation part 4. The cover shell 9 may be coupled to the insulation part 4 to cover at least a portion of the insulation part 4. The insulation part 4 may be accommodated in an accommodating groove (not illustrated) formed in the cover shell 9. The rear surface of the cover shell 9 may be opened such that the first coaxial cable 5 and the second coaxial cable 6 are inserted therein. The first coaxial cable 5 and the second coaxial cable 6 may be coupled to the insulation part 4 through the rear surface of the cover shell 9.

The cover shell 9 may include a first cover shell 91 and a second cover shell 92.

The first cover shell 91 accommodates the insulation part 4. The first cover shell 91 may be formed with a connection hole (not illustrated) for exposing the first RF contact member 21 and the second RF contact member 31 to the outside while the insulation part 4 is accommodated. The connection hole may be formed through a lower portion of the first cover shell 91. The first RF contact member 21 and the second RF contact member 31 are implemented to be connected to the RF connector of the first counterpart connector 111 through the connection hole. The first cover shell 91 may include a front shielding member 911 (illustrated in FIG. 7), a left shielding member 912 (illustrated in FIG. 7), a right shielding member 913 (illustrated in FIG. 7), an upper shielding member 914 (illustrated in FIG. 10) and a lower shielding member 915 (illustrated in FIG. 10).

The front shielding member 911 is disposed in front of the insulation part 4 (FD arrow direction). The forward direction (FD arrow direction) refers to a direction which is parallel to the second axial direction (Y-axis direction). The forward direction (FD arrow direction) may mean a direction from the first coaxial cable 5 or the second coaxial cable 6 toward the insulation part 4. The front shielding member 911 may be disposed to cover the front surface of the insulation part 4. The front surface of the insulation part 4 is a surface which is disposed to face the front (FD arrow direction) from the insulation part 4. The front shielding member 911 is grounded, whereby RF signals generated from each of the first RF contact 2, the second RF contact 3, the first coaxial cable 5 and the second coaxial cable 6 may be prevented from being radiated forward (FD arrow direction). Accordingly, the connector 1 according to the present disclosure may implement a shielding function in the front (FD arrow direction) by using the front shielding member 911.

The partition wall part 7 is grounded through the cover shell 9 so as to shield between the first RF contact 2 and the first coaxial cable 5, and the second RF contact 3 and the second coaxial cable 6. To this end, the partition wall part 7 may extend forward (FD arrow direction) with respect to the second axial direction (Y-axis direction) to be connected to the front shielding member 911. Accordingly, the partition wall part 7 may be grounded through the front shielding member 911, and the front shielding member 911 may also be grounded through the partition wall part 7.

The left shielding member 912 is disposed on one side of the insulation part 4 with respect to the first axial direction (X-axis direction). The left shielding member 912 may be disposed to face to the left (LD arrow direction) with respect to the insulation part 4. The left side (LD arrow direction) means a direction which is parallel to the first axial direction (X-axis direction). The left side (LD arrow direction) may be a direction from the second RF contact 3 toward the first RF contact 2. The left shielding member 912 may be disposed to cover the left surface of the insulation part 4. The left surface of the insulation part 4 is a plane which is disposed to face the left side (LD arrow direction) of the insulation part 4. Accordingly, the connector 1 according to the present disclosure may prevent the RF signals generated from each of the first RF contact 2 and the first coaxial cable 5 from being radiated to the left side (LD arrow direction) by using the left shielding member 912. Accordingly, the connector 1 according to the present disclosure may implement a shielding function to the left side (LD arrow direction) through the left shielding member 912.

The right shielding member 913 is disposed on the other side of the insulation part 4 with respect to the first axial direction (X-axis direction). It may be disposed to face to the right side (RD arrow direction) with respect to the insulation part 4. The right side (RD arrow direction) refers to a direction which is opposite to the left side (LD arrow direction). The right side (RD arrow direction) may be a direction from the first RF contact 2 toward the second RF contact 3. The right shielding member 913 may be disposed to cover the right surface of the insulation part 4. The right side of the insulation part 4 is a plane which is disposed to face the right side (RD arrow direction) in the insulation part 4. Accordingly, the connector 1 according to the present disclosure may prevent the RF signals generated from each of the first RF contact 2 and the first coaxial cable 5 from being radiated to the right side (RD arrow direction) by using the right shielding member 913. Accordingly, the connector 1 according to the present disclosure may implement a shielding function to the right side (RD arrow direction) through the right shielding member 913.

The upper shielding member 914 is disposed on the insulation part 4. The upper portion of the insulation part 4 may mean one side of the insulation part 4 with respect to a third axial direction (Z-axis direction) which is perpendicular to the first axial direction (X-axis direction) and the second axial direction (Y-axis direction). The upper shielding member 914 may be disposed to face upward (UD arrow direction) with respect to the insulation part 4. The upward direction (UD arrow direction) is a direction of the third axis direction (a direction parallel to the Z-axis direction). The upward direction (UD arrow direction) may mean a direction which is opposite to the direction from the insulation part 4 toward the connection hole. The upper shielding member 914 may be disposed to cover the upper surface of the insulation part 4. The upper surface of the insulating part 4 is a surface which is disposed to face upward (UD arrow direction) from the insulating part 4. The upper shielding member 914 may prevent the RF signals generated from each of the first RF contact 2, the second RF contact 3, the first coaxial cable 5 and the second coaxial cable 6 from being radiated upward (UD arrow direction). Accordingly, the connector 1 according to the present disclosure may implement a shielding function upward (UD arrow direction) by using the upper shielding member 914.

The lower shielding member 915 is disposed under the insulation part 4. The lower portion of the insulation part 4 may mean the other side of the insulation part 4 with respect to the third axial direction (Z-axis direction). The lower shielding member 915 may be disposed to face downward (DD arrow direction) with respect to the insulation part 4. The downward direction (DD arrow direction) means a direction which is opposite to the upward direction (UD arrow direction). The downward direction (DD arrow direction) may mean a direction from the insulation part 4 toward the connection hole. The lower shielding member 915 may be disposed to cover the lower surface of the insulation part 4. The lower surface of the insulation part 4 is a surface which is disposed to face downward (DD arrow direction) from the insulation part 4. The lower shielding member 915 may prevent the RF signals generated from each of the first RF contact 2, the second RF contact 3, the first coaxial cable 5 and the second coaxial cable 6 from being radiated downward (DD arrow direction). Accordingly, the connector 1 according to the present disclosure may implement a shielding function downward (DD arrow direction) by using the lower shielding member 915.

Figure 8:
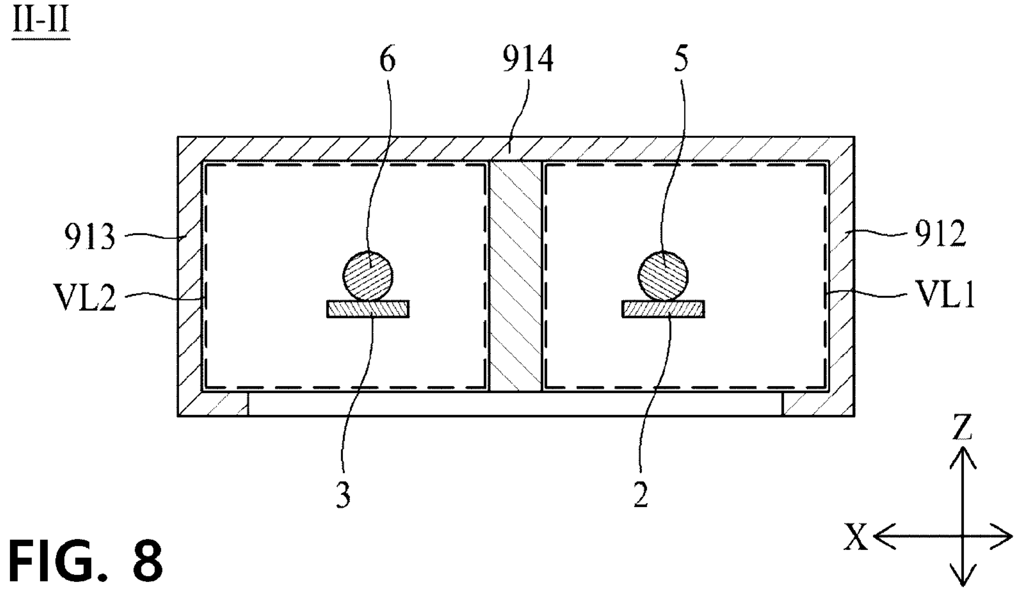
FIG. 8 is a schematic front cross-sectional view taken along line II-II of FIG. 6.

Referring to FIG. 8, the left shielding member 912, the upper shielding member 914 and the partition wall part 7 may implement a shielding force for the first RF contact 2 and the first coaxial cable 5, and the right shielding member 913, the upper shielding member 914 and the partition wall part 7 may implement a shielding force for the second RF contact 3 and the second coaxial cable 6. Accordingly, with respect to a vertical plane (XZ plane), the connector 1 according to the present disclosure may implement a first vertical ground loop VL1 for the first RF contact 2 and the first coaxial cable 5, and a second vertical ground loop VL2 for the second RF contact 3 and the second coaxial cable 6. Herein, the vertical plane (XZ plane) means a plane which is parallel to the first axial direction (X-axis direction) and the third axial direction (Z-axis direction).

When the partition wall part 7 is grounded through a ground connector of the first counterpart connector 111, the front shielding member 911 and the upper shielding member 914 may be grounded through the partition wall part 7. To this end, the partition wall part 7 may extend along the second axial direction (Y-axis direction) to be connected to the front shielding member 911, and extend along the third axial direction (Z-axis direction) to be connected to the upper shielding member 914. The left shielding member 912 and the right shielding member 913 may be coupled to at least one of the front shielding member 911 and the upper shielding member 914 so as to be grounded through the partition wall part 7. As a result, the front shielding member 911, the left shielding member 912, the right shielding member 913 and the upper shielding member 914 are grounded through the partition wall part 7, thereby performing a shielding function.

Referring to FIGS. 3 to 12, the second cover shell 92 is disposed under the insulation part 4. The second cover shell 92 may be detachably coupled to the first cover shell 91. The second cover shell 92 may be integrally formed with the first cover shell 91. Hereinafter, a case in which the second cover shell 92 is detachably coupled to the first cover shell 91 will be described. The second cover shell 92 may be coupled to the partition wall part 7. The second cover shell 92 may be integrally formed with the partition wall part 7. In this case, the partition wall part 7 may be formed by bending processing based on a coupling line coupled to the second cover shell 92. The second cover shell 92 may be formed of a conductive material. For example, the second cover shell 92 may be formed of a metal material.

Referring to FIGS. 4 to 10, the connector 1 according to the present disclosure may include an alignment part 8. The alignment part 8 is for aligning the first coaxial cable 5 and the second coaxial cable 6. The alignment part 8 may be coupled to the first coaxial cable 5 and the second coaxial cable 6 to align the first coaxial cable 5 and the second coaxial cable 6. The first coaxial cable 5 may be inserted into the first cable insertion hole 81 formed in the alignment part 8 and coupled to the alignment part 8, and the second coaxial cable 6 may be inserted into the second cable insertion hole 82 formed in the alignment part 8 and coupled to the alignment part 8. The second cable insertion hole 82 may be formed in the alignment part 8 to be spaced apart from the first cable insertion hole 81 in the first axial direction (X-axis direction). Accordingly, the connector 1 according to the present disclosure is implemented to be coupled through the alignment part 8, while the first coaxial cable 5 and the second coaxial cable 6 are spaced apart in the first axial direction (X-axis direction). Accordingly, by maintaining a state in which the first coaxial cable 5 and the second coaxial cable 6 to be spaced apart from each other in the first axial direction (X-axis direction) by using the alignment part 8, the connector 1 according to the present disclosure may reduce the degree of damage or breakage caused by interference between the first coaxial cable 5 and the second coaxial cable 6 due to vibration or shaking.

The alignment part 8 may be coupled to the second cover shell 92. The second cover shell 92 may include an alignment accommodating groove 921 and an alignment support part 922. The alignment accommodating groove 921 is for accommodating the alignment part 8. The alignment accommodating groove 921 may be disposed at the rear side (BD arrow direction) of the insulation part 4 with respect to the second axial direction (Y-axis direction). The alignment accommodating groove 921 may be implemented to communicate with the first cable accommodating groove 44 and the second cable accommodating groove 45. Accordingly, when the alignment part 8 is accommodated in the alignment accommodating groove 921 in a state of being coupled to the first coaxial cable 5 and the second coaxial cable 6, the first coaxial cable 5 and the second coaxial cable 6 may be inserted into the first cable accommodating groove 44 and the second cable accommodating groove 45, respectively, so as to be electrically connected to the first RF contact 2 and the second RF contact 3.

The alignment support part 922 is for supporting the alignment part 8. The alignment support part 922 may restrict the separation of the alignment part 8 from the alignment accommodating groove 921 by supporting the alignment part 8. The alignment support part 922 may include a lower support member 9221 disposed under the alignment part 8, a left support member 9222 disposed on the left side of the alignment part 8, and a right support member 9223 disposed on the right side of the alignment part 8.

The lower support member 9221 may support the alignment part 8 so as to restrict the movement of the alignment part 8 in the third axial direction (Z-axis arrow direction) while the alignment part 8 is accommodated in the alignment accommodating groove 921. Specifically, the lower support member 9221 may support the lower portion of the alignment part 8, thereby restricting the movement of the alignment part 8 downward (DD arrow direction).

The left support member 9222 may support the alignment part so as to restrict the movement of the alignment part 8 in the first axial direction (X-axis arrow direction) while the alignment part 8 is accommodated in the alignment accommodating groove 921. Specifically, the left support member 9222 may support the left side of the alignment part 8 to restrict the movement of the alignment part 8 to the left side (LD arrow direction). The left support member 9222 may support the rear surface of the alignment part 8 by bending toward the alignment part 8 with respect to the first axis direction (X-axis direction). Accordingly, the movement of the alignment part 8 to the left side (LD arrow direction) may be restricted due to the left support member 9222 and the movement to the rear side (BD arrow direction) may be restricted.

The right support member 9223 may support the alignment part 8 so as to restrict the movement of the alignment part 8 in the first axial direction (X-axis arrow direction) while the alignment part 8 is accommodated in the alignment accommodating groove 921. Specifically, the right support member 9223 may support the right side of the alignment part 8, thereby restricting the movement of the alignment part 8 to the right side (RD arrow direction) of the alignment part 8. The right support member 9223 may support the rear surface of the alignment part 8 by bending toward the alignment part 8 with respect to the first axis direction (X axis direction). Accordingly, the alignment part 8 may be restricted from moving to the right side (RD arrow direction) and also the rear side (BD arrow direction) due to the right support member 9223. Meanwhile, the upper shielding member 914 may restrict the movement of the alignment part 8 upward (UD arrow direction) by supporting the upper portion of the alignment part 8.

Accordingly, the connector 1 according to the present disclosure may prevent the alignment part 8 which is accommodated in the alignment accommodating groove 921 from separating from the alignment accommodating groove 921 by vibration or impact by using the alignment support part 922. The alignment part 8 may be implemented in a structure in which two alignment parts (not illustrated) are assembled. The alignment parts may be formed in the same shape.

The alignment part 8 may be accommodated in the alignment accommodating groove 921 in a state of being coupled to the first coaxial cable 5 and the second coaxial cable 6 to implement shielding for the rear side of the insulation part 4 (BD arrow direction). To this end, the alignment part 8 may be disposed behind the insulation part 4 (BD arrow direction). Accordingly, in the cover shell 9, the rear surface which is open for inserting the first coaxial cable 5 and the second coaxial cable 6 may be covered by the alignment part 8. Accordingly, the connector 1 according to the present disclosure may perform a shielding function for preventing RF signals, electromagnetic waves and the like that are generated from the first RF contact 2, the second RF contact 3, the first coaxial cable 5 and the second coaxial cable 6 from being radiated outside in the rear side (BD arrow direction) by using the alignment part 8. The alignment part 8 may be formed of a conductive material. For example, the alignment part 8 may be formed of a metal material.

Referring to FIG. 8, the front shielding member 911, the left shielding member 912, the alignment part 8 and the partition wall part 7 may implement a shielding force for the first RF contact 2 and the first coaxial cable 5, and the front shielding member 911, the right shielding member 913, the alignment part 8 and the partition wall part 7 may implement a shielding force for the second RF contact 3 and the second coaxial cable 6. Accordingly, with respect to a horizontal plane (XY plane), the connector 1 according to the present disclosure may implement a first horizontal ground loop HL1 for the first RF contact 2 and the first coaxial cable 5, and implement a second horizontal ground loop HL2 for the second RF contact 3 and the second coaxial cable 6. Herein, the horizontal plane (XY plane) means a plane which is parallel to the first axial direction (X-axis direction) and the second axial direction (Y-axis direction).

The partition wall part 7 may extend forward (FD arrow direction) with respect to the second axial direction (Y-axis direction) to be connected to the front shielding member 911, and may extend backward (BD arrow direction) with respect to the second axial direction (Y-axis direction) to be connected to the alignment part 8. Accordingly, when the grounding member 72 of the partition wall part 7 is grounded to a counterpart grounding contact of the first counterpart connector 111, the front shielding member 911 may be grounded through the partition wall part 7, and the alignment part 8 may be grounded through the partition wall part 7.

Figure 9:
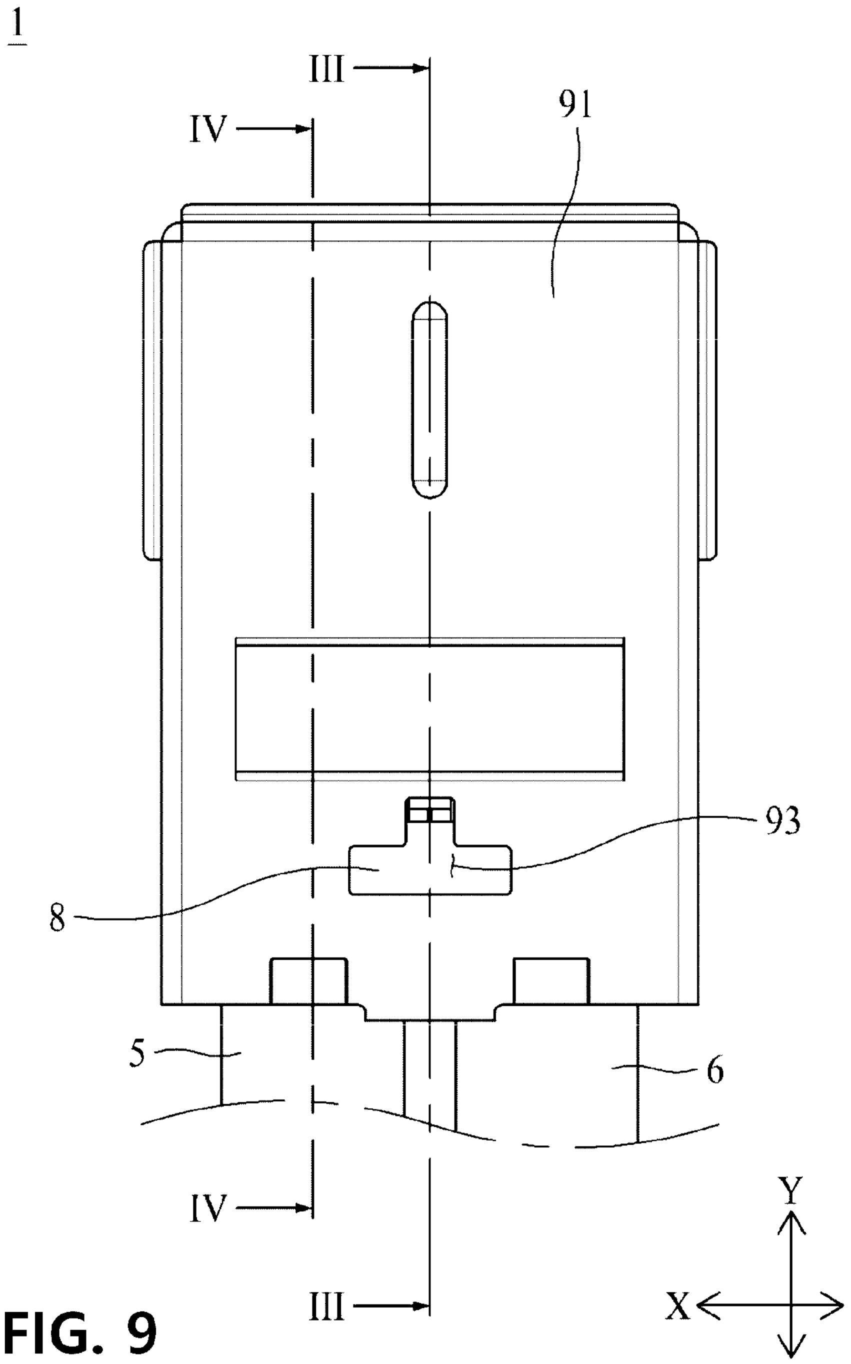
FIG. 9 is a schematic plan view of the connector according to the present disclosure.

Referring to FIGS. 9, 10 and 12, the cover shell 9 may include a first connection inspection window 93.

The first connection inspection window 93 is for inspecting whether the partition wall part 7 and the alignment part 8 are connected. The first connection inspection window 93 may be formed in the cover shell 9. The first connection inspection window 93 may be formed through the upper shielding member 914. The first connection inspection window 93 may be formed on the upper shielding member 914 to be located at a position where the partition wall part 7 and the alignment part 8 are connected. Accordingly, the connector 1 according to the present disclosure is implemented to inspect whether the partition wall part 7 and the alignment part 8 are connected through the first connection inspection window 8 without separating the cover shell 9 from the insulation part 4.

The cover shell 9 may further include the second connection inspection window 94. The second connection inspection window 94 may be disposed on the opposite side of the first connection inspection window 93 with respect to the alignment part 8. The second connection inspection window 94 may be formed through the second cover shell 92. The second connection inspection window 94 may be located at a position where the partition wall part 7 and the alignment part 8 are connected. Accordingly, since the connector 1 according to the present disclosure may inspect whether the partition wall part 7 and the alignment part 8 are connected through the second connection inspection window 94 in addition to the first connection inspection window, it is implemented to be able to confirm whether the partition wall part 7 and the alignment part 8 are connected in various directions.

The present disclosure as described above is not limited to the above-described exemplary embodiments and the accompanying drawings, and it will be clear to those skilled in the art that various substitutions, modifications and changes are possible within the scope of the technical spirit of the present disclosure.

The invention claimed is:

1. A connector, comprising:

a first radio frequency (RF) contact for RF signal transmission;

a second RF contact which is spaced apart from the first RF contact in a first axial direction;

an insulation part to which the first RF contact and the second RF contact are coupled;

a cover shell to which the insulation part is coupled;

a first coaxial cable which is electrically connected to the first RF contact;

a second coaxial cable which is spaced apart from the first coaxial cable in the first axial direction and electrically connected to the second RF contact;

a partition wall part which is coupled to the cover shell such that, with respect to the first axial direction, the first RF contact and the first coaxial cable are disposed on one side and the second RF contact and the second coaxial cable are disposed on the other side; and an alignment part which is coupled to the first coaxial cable and the second coaxial cable, wherein a rear surface of the cover shell is formed to be open so that the first coaxial cable and the second coaxial cable are inserted therethrough, and wherein the alignment part is received in an alignment receiving groove of the cover shell and shields the rear surface of the cover shell.

2. The connector of claim 1, wherein the partition wall part is grounded through the cover shell to shield between the first RF contact and the first coaxial cable, and the second RF contact and the second coaxial cable.

3. The connector of claim 2, wherein the cover shell comprises an upper shielding member which is disposed on an upper portion of the insulation part, a left shielding member which is disposed on a left side of the insulation part, and a right shielding member which is disposed on a right side of the insulation part, wherein the left shielding member, the upper shielding member and the partition wall part are configured to implement a shielding for the first RF contact and the first coaxial cable, and wherein the right shielding member, the upper shielding member and the partition wall part are configured to implement a shielding for the second RF contact and the second coaxial cable.

4. The connector of claim 1, wherein a first cable insertion hole and a second cable insertion hole which is spaced apart from the first cable insertion hole along the first axial direction are formed in the alignment part, and wherein the first coaxial cable is inserted into the first cable insertion hole to be coupled to the alignment part, and the second coaxial cable is inserted into the second cable insertion hole to be coupled to the alignment part.

5. The connector of claim 1, wherein the cover shell comprises an alignment support part for supporting the alignment part, and wherein the alignment support part comprises a lower support member which is disposed below the alignment part, a left support member which is disposed on a left side of the alignment part and a right support member which is disposed on a right side of the alignment part.

6. The connector of claim 1, wherein the cover shell comprises a left shielding member which is disposed on a left side of the insulation part, a right shielding member which is disposed on a right side of the insulation part, and a front shielding member which is disposed in front of the insulation part, wherein the front shielding member, the left shielding member, the alignment part and the partition wall part are configured to implement a first shielding for the first RF contact and the first coaxial cable, and wherein the front shielding member, the right shielding member, the alignment part and the partition wall part are configured to implement a second shielding for the second RF contact and the second coaxial cable.

7. The connector of claim 1, wherein the cover shell comprises a first connection inspection window, and wherein the first connection inspection window is located at a position where the partition wall part and the alignment part are connected.

8. The connector of claim 7, wherein the cover shell comprises a second connection inspection window which is disposed on an opposite side of the first connection inspection window with respect to the alignment part, and wherein the second connection inspection window is located at a position where the partition wall part and the alignment part are connected.

9. The connector of claim 1, wherein the insulation part comprises a first RF protrusion for supporting the first RF contact, and a second RF protrusion for supporting the second RF contact, wherein the partition wall part comprises a first grounding member to be grounded by a counterpart grounding member of a counterpart connector, and wherein the grounding member is located between the first RF protrusion and the second RF protrusion to shield between the first RF contact and the second RF contact.

10. The connector of claim 1, further comprising:

an alignment part which is coupled to the first coaxial cable and the second coaxial cable, and wherein the partition wall part extends in a second axial direction to be connected to the alignment part.

11. The connector of claim 1, wherein the first coaxial cable comprises a first connecting pin which is electrically connected to a first RF connecting member of the first RF contact, wherein the second coaxial cable comprises a second connecting pin which is electrically connected to a second RF connecting member of the second RF contact, and wherein the partition wall part is disposed between the first connecting pin and the second connecting pin.

* * * * *